United States Patent [19]

Mizutani et al.

[11] Patent Number: 5,786,422
[45] Date of Patent: Jul. 28, 1998

[54] POLYPHENYLENE SULFIDE RESIN COMPOSITION

[75] Inventors: Yosinobu Mizutani; Takeo Asakawa; Hiroshi Inoue; Toshikazu Kato, all of Mie-ken, Japan

[73] Assignee: Tosoh Corporation, Yamaguchi-Ken, Japan

[21] Appl. No.: 833,030

[22] Filed: Feb. 10, 1992

[30] Foreign Application Priority Data

Feb. 13, 1991 [JP] Japan ................................ 3-040577
Jan. 21, 1992 [JP] Japan ................................ 4-029025

[51] Int. Cl.$^6$ ............................................. C08G 63/48
[52] U.S. Cl. ............................................. 525/64; 525/189
[58] Field of Search ............................... 525/64, 189

[56] References Cited

U.S. PATENT DOCUMENTS

| | | | |
|---|---|---|---|
| 4,544,700 | 10/1985 | Wright | 525/189 |
| 5,015,703 | 5/1991 | Takekoshi et al. | 525/537 |
| 5,086,129 | 2/1992 | Kohler et al. | 525/537 |
| 5,087,666 | 2/1992 | Yu et al. | 525/189 |

FOREIGN PATENT DOCUMENTS

| | | |
|---|---|---|
| A60-229949 | 11/1985 | Japan. |
| A61-207462 | 9/1986 | Japan. |
| A-62-172056 | 7/1987 | Japan. |
| A62-172057 | 7/1987 | Japan. |
| WO-A 9118054 | 11/1991 | WIPO. |

OTHER PUBLICATIONS

Abstract of JP-A 2-178-339 Mitsubishi Petrochemical Industries.
Abstract of JP-A 62-172-056 Toray Industries, Ltd.
Abstract of JP-A 1-207-462 Dainippon Ink Chemicals K.K.
Abstract of JP-A 1-051-462 Shinetsu Polymer Co., Ltd.

*Primary Examiner*—Helen L. Pezzuto
*Attorney, Agent, or Firm*—Sughrue, Mion, Zinn, Macpeak & seas, PLLC

[57] ABSTRACT

A polyphenylene sulfide resin composition improved in the impact strength, toughness, high temperature resistance and solvent resistance properties is disclosed. The composition comprises (A) 60–99.5% by weight of a thermally cured polyphenylene sulfide material having a melt viscosity of 500–30,000 poises and which has been derived, by thermally curing, from a polyphenylene sulfide having a melt viscosity of 400 poises of higher and containing 0.05–5 mol % of amino groups on the basis of the phenylene sulfide repeating units, and (B) 40–0.5% by weight of a modified polyethylene material comprising at least one polyethylene onto which at least one unsaturated carboxylic acid and/or derivative thereof is graft-copolymerized in a proportion of 0.1–10% by weight of the total weight of said modified polyethylene material.

17 Claims, No Drawings

POLYPHENYLENE SULFIDE RESIN COMPOSITION

BACKGROUND OF THE INVENTION

1. Field of the Invention

This invention relates to a resin composition comprising a specified class of polyphenylene sulfides containing amino groups and a modified polyethylene on to which at least one unsaturated carboxylic acid and/or derivative thereof is graft-polymerized and, more particularly, to such a composition exhibiting excellent impact, toughness, high-temperature resistance and solvent resistance properties.

2. Prior Art

Polyphenylene sulfide resins are known as a class of highly functional resins exhibiting excellent high-temperature resistance, fire retardance, chemical resistance, moldability, shapability and electrical characteristics and the like, and recently are used widely in applications including the production of electrical and electronic parts, automotive parts, etc.

Polyphenylene sulfide resins may be substantially improved in their properties such as strength, rigidity, high-temperature resistance, toughness, dimensional stability, etc., by incorporating them with fibrous reinforcements, such as glass fibers or carbon fibers, or inorganic fillers, such as talc, clay or mica. Generally, polyphenylene sulfide resins, however, suffer from a serious drawback that they exhibit poor ductility properties and are brittle as compared with other known engineering plastics such as nylons, polycarbonates, polybutylene terephthalate, polyacetals and the like. Therefore, polyphenylene sulfide resins have been excluded from using in a certain, relatively wide range of applications.

Upto the date, it has been established to improve the toughness or impact strength properties of polyphenylene sulfide by blending with a flexible polymer. For example, Japanese Patent Public Disclosure (IOKAI) No. 59-207921 discloses a method in which a polyphenylene sulfide material is blended with an epoxy resin and a modified α-olefin copolymeric elastomer having an unsaturated carboxylic acid or anhydride or a derivative thereof graft-copolymerized thereon. Further, methods comprising blending a polyphenylene sulfide material with an ethylene-glycidyl methacrylate copolymer are known, for example, in Japanese Patent Public Disclosures Nos. 58-1547 and 59-152953. However, the backbones of the ordinary polyphenylene sulfide molecules lack any effectively reactive site. Therefore, even if a significantly reactive olefin copolymer is added to such an ordinary polyphenylene sulfide material, the added copolymer may exhibit only a poor adhesion or bonding at the interface between the additive and the polyphenylene sulfide material, resulting an unacceptable improvement in the impact resistance. Furthermore, there may be serious difficulties that the resulting blend shows deteriorated high-temperature resistance and solvent resistance properties.

On the other hand, various polyphenylene sulfide compositions have been proposed, which comprise polyphenylene sulfide materials that have been treated with techniques to improve the adhesion or bonding at the interface between the polyphenylene sulfide and a flexible polymer additive. Examples of the compositions of this type which may be mentioned include a composition comprising a polyphenylene sulfide that has been treated with an acid and washed, in combination with a modified olefin copolymer having an unsaturated carboxylic acid or anhydride graft-copolymerized thereon, see Japanese Patent Public Disclosure No. 62-169854; and a composition comprising a polyphenylene sulfide in combination with an olefin copolymer formed of an α-olefin and a glycidyl ester of α,β-unsaturated carboxylic acid, see Japanese Patent Public Disclosure No. 62-153343. However, the impact resistance properties of polyphenylene sulfide cannot be acceptably improved even with these compositions.

Further, various polyphenylene sulfide compositions has been proposed, which comprise polyphenylene sulfide materials that have been modified with techniques to improve the adhesion or bonding at the interface between the polyphenylene sulfide and a flexible polymer additive. An example which may be mentioned is a composition comprising an amino and/or amide-containing polyphenylene sulfide and a thermoplastic elastomer, see Japanese Patent Public Disclosure No. 61-207462. By this approach, the adhesion or bonding at the interface between the polyphenylene sulfide and the thermoplastic elastomer may be improved only to an extent that is unsatisfactory in practice.

SUMMARY OF THE INVENTION

An object of primary importance of the invention is to provide a polyphenylene sulfide resin composition that is significantly improved in the impact resistance and toughness properties and is substantially freed from the problems and difficulties experienced with the above-discussed prior art.

Accordingly, the present invention relates to a resin composition comprising a thermally cured, specific polyphenylene sulfide material modified by inclusion of amino groups in the molecule and which has a viscosity in a specified range before curing and another specified viscosity after curing, in conjunction with a modified polyethylene material on to which 0.5–10% by weight of at least one unsaturated carboxylic acid and/or derivative thereof is graft-copolymerized. In the composition, the modified polyethylene material exhibits an enhanced adhesion or bonding at the interface between the polyphenylene sulfide and polyethylene materials and permits formation of a homogeneous dispersion.

Accordingly, the invention provides a polyphenylene sulfide resin composition which comprises (A) 60–99.5% by weight of a thermally cured polyphenylene sulfide material having a melt viscosity of 500–30,000 poises and which has been derived, by thermally curing, from a polyphenylene sulfide having a melt viscosity of 400 poises or higher and containing 0.05–5 mol % of amino groups on the basis of the phenylene sulfide repeating units, and (B) 40–0.5% by weight of a modified polyethylene material comprising at least one polyethylene onto which at least one unsaturated carboxylic acid and/or derivative thereof is graft-copolymerized in a proportion of 0.1–10% by weight of the total weight of said modified polyethylene material.

DETAILED DESCRIPTION OF THE INVENTION

The invention will be described in more detail.

Preferably, the amino-containing polyphenylene sulfide material which is used in the present invention has an amino-group content of 0.05–5 mol % and, particularly, of 0.1–3 mol %. If the amino-group content is less than 0.05 mol %, there is little advantage achieved by the inclusion of amino groups. If the amino-group content is greater than 5 mol %, then the advantageous effect by the inclusion of amino groups is undesirably offset by deterioration of the mechanical strength properties.

The amino-containing polyphenylene sulfide material which is used in the invention should have a melt viscosity of not less than 400 poises, preferably not less than 500 poises before curing, as measured in a KOHKA type flow tester at 300° C. using an orifice of a 0.5 mm diameter and a 2 mm length under a load of 10 kg, and should have a melt viscosity in the range of from 500 to 30,000 poises, preferably from 1,000 to 20,000 poises after curing as measured similarly. If the polyphenylene sulfide material has a melt viscosity of less than 400 poises before curing or a melt viscosity less than 500 poises after curing, the intended improvement in the toughness properties of the composition is achieved only to an unsatisfactory extent. If the cured polyphenylene sulfide material has a melt viscosity of greater than 30,000 poises, then the moldability of the composition becomes unacceptably deteriorated.

The method for preparing the amino-containing polyphenylene sulfide materials to be used in the present invention is not limited to any specific one. However, a preferred example of the methods for this purpose comprises conducting a polymerization by reacting an alkali metal sulfide with a dihalobenzene in an organic amide solvent in the presence of an amino-containing aromatic halide compound. Especially, it is preferred that the amino groups are introduced at ends of the molecule of polyphenylene sulfide.

Examples of the alkali metal sulfides which may be used include lithium, sodium, potassium, rubidium and cesium sulfide and mixtures thereof. These may be in hydrated form. The alkali metal sulfide may be prepared by reacting an alkali metal hydrosulfide with an alkali metal base. The alkali metal sulfide may be formed in situ prior to introduction of the dihalobenzene reactant into the polymerization system, or may be prepared out the polymerization system before use.

The amino-containing polyphenylene sulfide material should preferably comprises at least 70 mol % and more preferably at least 90 mol % of structural unit represented by:

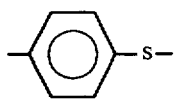

The polyphenylene sulfide material may comprise less than 30 mol %, preferably less than 10 mol %, of one or more comonomer.

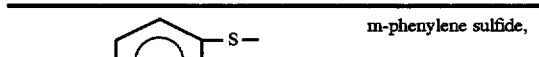
m-phenylene sulfide,

o-phenylene sulfide,

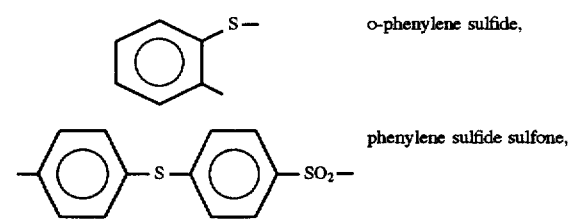
phenylene sulfide sulfone,

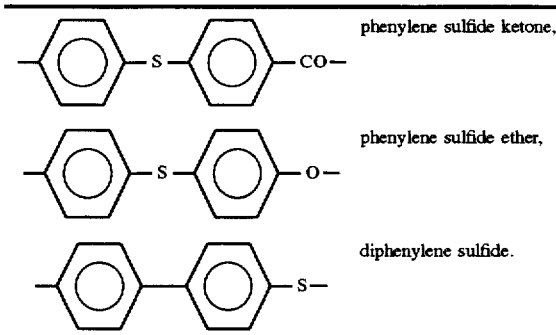
phenylene sulfide ketone, phenylene sulfide ether, diphenylene sulfide.

The amino-containing aromatic halide reactants which may be used in the synthesis of the amino-containing polyphenylene sulfide material according to the invention are of the general formula:

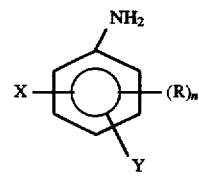

where X is a halogen, Y is hydrogen, —$NH_2$ or a halogen, each R is a hydrocarbyl group containing 1–12 carbon atoms, and n is an integer of 0–4.

Typical examples of the halide reactants include m-fluoroaniline, m-chloroaniline, 3,5-dichloroaniline, 3,5-diaminochlorobenzene, 2-amino-4-chlorotoluene, 2-amino-6-chlorotoluene, 4-amino-2-chlorotoluene, 3-chloro-m-phenylenediamine, m-bromoaniline, 3,5-dibromoaniline and m-iodoaniline and mixtures thereof. Especially preferred is 3,5-diaminochlorobenzene.

Examples of the dihalobenzene reactants include p-dichlorobenzene, p-dibromobenzene, p-diiodobenzene, m-dichlorobenzene, m-dibromobenzene, m-diiodobenzene, 1-chloro-4-bromobenzene and the like.

The molar ratio of the alkali metal sulfide reactant to the total of the dihalobenzene and amino-containing aromatic halide reactants is preferably in the range of from 1.00:0.90 to 1.00:1.10.

As the polymerization medium, a polar solvent, in particular an organic amide solvent that is aprotic and is stable against alkali at raised temperatures is preferred. Typical examples of suitable organic amide solvents include N,N-dimethyl acetamide, N,N-dimethyl formamide, hexamethyl phosphoramide, N-methyl-ε-caprolactam, N-ethyl-2-pyrrolidone, N-methyl-2-pyrrolidone, 1,3-dimethylimidazolidinone, dimethyl-sulfoxide, sulfolane, tetramethylurea and the like and mixtures thereof.

The organic amide solvent may be used in an amount of 150–3500%, preferably 250–1500%, by weight of the weight of polymer to be produced by the polymerization.

The polymerization is effected with stirring at a temperature of 200°–300° C., preferably 220°–280° C., for a period of 0.5–30 hours, preferably 1–15 hours.

The polymerization degree of the product polymer produced by the above method may be enhance by heating the product polymer in an oxygen-containing atmosphere, e.g. air or by adding, for example, a peroxide to the polymer and then heating the mixture so as to cure the polymer. Such a thermal curing treatment may be effected, for example, at temperatures in the range of 200°–280° C. for 1–12 hours.

Especially, in order to obtain a composition of excellent impact resistance and toughness properties, preferably, the amino-containing polyphenylene sulfide is cured by heating it in a nonoxidizing, inert gas at a temperature in the range of about 200°—about 280° C. for a period of 1–24 hours. Examples of the nonoxidizing, inert gases which may be used include helium, argon, nitrogen, carbon dioxide, steam and the like and mixtures thereof. For an economical operation, nitrogen is preferably used.

The modified polyethylene material used in the invention is a polyethylene on to which 0.1–10% by weight of an unsaturated carboxylic acid and/or derivative is graft-copolymerized.

The term "polyethylene" as used herein is intended to refer at lease one, such as high density polyethylene, low density polyethylene, linear low density polyethylene and the like, with high density polyethylene most preferred.

The modified polyethylene material used in the invention has a content of unsaturated carboxylic acid and/or derivative ranging from 0.1 to 10%, preferably from 1 to 5%, by weight. If the content is less than 0.1 wt. %, the advantageous effect achieved by modification with the acid component is not significant. On the other hand, if the content is greater than 10 wt. %, then the mechanical strength properties become seriously deteriorated.

Examples of the unsaturated carboxylic acids and/or derivatives thereof which may be used include acrylic, methacrylic, maleic, fumaric, itaconic and citraconic acids and derivatives thereof. Such an acid or derivative will be referred to as "monomer" hereinafter.

Examples of acid derivatives include anhydrides, esters, amides, imides and metal salts. Particular examples include maleic, citraconic and itaconic anhydrides; methyl-, ethyl- and butyl-acrylates and methacrylates; glycidyl acrylate; mono- and di-ethyl malates; mono- and di-methyl fumarates; mono- and di-ethyl itaconates; acryl and methacryl amides; maleic mono- and di-amides; maleic-N-monoethyl amide, maleic-N,N-diethyl amide, maleic-N-monobutyl amide, maleic-N,N-dibutyl amide, fumaric mono- and di-amides, fumaric-N-monoethyl amide, fumaric-N,N-diethyl amide, fumaric-N-monobutyl amide, fumaric-N,N-dibutyl amide, maleimide, N-butyl maleimide, N-phenyl maleimide, sodium acrylate and methacrylate, potassium acrylate and methacrylate, and the like. These monomers may be used singly or in combination. Maleic anhydride is most preferred.

An example of the techniques for graft-copolymerizing the monomer acid on to a polyethylene substrate is a process comprising mixing the polyethylene substrate with the monomer and a radical generator, for example, a peroxide and subjecting the mixture to melt-extrusion operation under copolymerization conditions. An alternative process is to suspend or dissolve a polyethylene substrate in an appropriate solvent and add a monomer and a radical generator to the suspension or solution, which is then heated so as to cause the graft-polymerization to proceed.

The peroxides used for modification in the melt-extrusion process are preferably organic peroxides. Any known organic peroxide may be used. Examples of the peroxides include:

2,5-dimethyl-2,5-di(tert.-butyl peroxy)hexyne-3;
2,5-dimethyl-2,5-di(tert.-butyl peroxy)hexane;
2,2-bis(tert.-butyl peroxy)-p-diiso-propyl benzene dicumyl peroxide;
di(tert.-butyl peroxide;
tert.-butyl peroxy benzoate;
1,1-bis(tart.-butyl peroxy)-3,3,5-trimethyl cyclohexane;
2,4-dichlorobenzoyl peroxide;
benzoyl peroxide;
p-chlorobenzoyl peroxide;
azobisisobutyronitrile; and the like.

Preferably, 2,5-dimethyl-2,5-di(tert.-butyl peroxy)hexane or 2,5-dimethyl-2,5-di(tert.-butyl peroxy)hexyne-3 is used.

The amount of organic peroxide added ranges from 0.005% to 2%, preferably from 0.1% to 1%, by weight of the weight of polyethylene substrate.

The present resin composition comprises 60–99.5%, preferably 80–97% by weight of the cured, amino-containing polyphenylene sulfide material; and 40–0.5%, preferably 20–3%, by weight of the modified polyethylene material having 0.5–10 wt. % of an unsaturated carboxylic acid and/or derivative thereof graft-copolymerized thereonto. If the modified polyethylene material is used in a proportion of less than 0.5% by weight, the intended improvement cannot be achieved satisfactorily. If the modified polyethylene material is in a proportion exceeding 40% by weight, then the desirable high-temperature resistance, chemical resistance and rigidity properties possessed by the polyphenylene sulfide are seriously damaged and the moldability of the composition tends to largely decline.

The composition according to the invention may be prepared by various known methods. The starting material amino-containing polyphenylene sulfide is thermally cured before use. The cured polyphenylene sulfide may be mixed with the modified polyethylene material having the acid and/or derivative graft-polymerized thereonto, in a mixer, such as tumbler mixer, Henschel mixer, ball mill, ribbon blender and the like. The mixture in powder or pelletized form may be fed into a melt-mixing or blending machine to give a resin composition according to the invention. Alternatively, the cured polyphenylene sulfide and modified polyethylene materials may be fed to a melt-mixing or blending machine and combined into a composition according to the invention. Melt-blending may be effected at a temperature of 250°–350° C. in a suitable machine, such as kneader, Banbury mixer, extruder or the like. For ease of operation, an extruder may be desirably employed for this purpose.

Provided that the object of the invention is not significantly spoiled, any conventional fibrous or powdery filler may be incorporated in the present resin composition; for example, fibers of glass, carbon, silica, alumina, silicon carbide, zirconia, calcium titanate, and calcium sulfate; fibers of aramide and wholly aromatic polyester, powders or particulates of wollastonite, calcium carbonate, magnesium carbonate, talc, mica, clay, silica, alumina, kaolin, zeolites, gypsum, calcium silicate, magnesium silicate, calcium sulfate, titanium oxide, magnesium oxide, carbon black, graphite, iron oxides, zinc oxide, copper oxide, glass, quartz and quartz glass; glass beads; and glass balloons. These fillers may be used a mixture thereof. If desired, the fillers may be treated with, for example, a silane or titanate coupling agent before use.

Glass fibers, for example, chopped strands of a fiber length 1.5–12 mm and a fiber diameter 3–24 µm, milled fibers of a fiber diameter 3–8 µm, glass flakes and powder of less than 325 mesh size may be mentioned as suitable examples.

In addition, provided that the object of the invention is not significantly spoiled, the present composition may include additives, such as releasing agent, lubricant, heat stabilizer, antioxidant, UV absorber, nucleating agent, blowing agent, rust-proofing agent, ion-trapping agent, flame-retardant, flame-proofing aid, colorant (e.g. dye or pigment), antistatic agent or the like; wax; and a minor proportion of other polymer. These may be present singly or in combination.

Examples of the other polymers which may be optionally incorporated includes various thermoplastic elastomer, such as olefin-, styrene-, urethane-, ester-, fluoride-, amide- and acrylate-based elastomers; rubbery polymers, such as polybutadiene, polyisoprene, polychloroprene, polybutene, styrene-butadiene rubber and hydrogenates thereof, acrylonitrile-butadiene rubber, ethylene-propylene copolymer and ethylene-propylene-ethylidene-norbornene copolymer; polyamides, such as nylon-6, -6/6, -4/6, -6/10, -11 and -12; polyesters, such as polyethylene terephthalate, polybutylene terephthalate and polyarylates; polystyrene, poly α-methylstyrene, polyvinyl acetate, polyvinyl chloride, polyacrylates, polymethacrylates, polyacrylonitrile, polyurethanes, polyacetals, polyphenylene oxides, polycarbonates, polysulfones, polyether sulfones, polyaryl sulfones, polyphenylene sulfide sulfones, polyphenylene sulfide ketones, polyether ketones, polyether ether ketones, polyamide imides, polyimides, silicone resins, phenoxy resins, fluorine resins and the like. Also may be mentioned as example, a class of resins which, when molten, form an anisotropic melt phase and may be melt-processed. The above-listed optional additive polymers may be used in a variety of forms, for example, as a homopolymer or as a random or block graft copolymer. They may be used singly or in any suitable combination and may be modified before use, if desired.

Incorporation of the additives into the present composition may be effected in any suitable manner. For example, the additives may be added to component (A) and/or (B) before or during the composition is prepared. Alternatively, the additive may be incorporated into the composition after the composition is formulated from components (A) and (B), in particular when the composition is molten before use.

EXAMPLE

The invention will be further illustrated with reference to the following Examples by which the scope of the invention is not restricted.

Preparation 1
Synthesis of amino-containing polyphenylene sulfide

A 15 liter-capacity autoclave was charged with 5 liters of N-methyl-2-pyrrolidone (referred to as NMP hereinafter) and heated to a temperature of 120° C. To the heated autoclave, 1,866 g of Na$_2$S.2.8H$_2$O was introduced. The mixture was heated slowly to 205° C. over a period of about 2 hours with stirring so as to distill 407 g of water off the autoclave. After the reaction system was cooled down to 140° C., 2080 g of p-dichlorobenzene was added. The autoclave was sealed and the reaction mixture was heated to 225° C. and allowed to polymerize for 3 hours at this temperature. Then the temperature of the reaction was raised up to 250° C. When 250° C. was attained, a solution of 3,5-diaminochlorobenzene 20.2 g (corresponding to about 1 mol % of the p-chlorobenzene used hereinabove) in 50 ml NMP was injected into the reaction system, which was allowed to be polymerized at 250° C. for a further period of 3 hours.

Upon completion of the polymerization, the reaction system was cooled to room temperature. A sample of the resulting slurry mixture was taken and filtered to give a filtrate. The proportion of unconverted 3,5-diaminochlorobenzene remaining in the filtrate was determined using a gas chromatograph apparatus (GC-12A manufactured by Shimadzu Seisakusho Ltd.). It was found that 38% of the 3,5-diaminochlorobenzene was converted.

The slurry from the above polymerization was poured into a mass of water so as to precipitate the product polymer, which was then filtered off, washed with pure water, and hot-vacuum dried overnight. The thus isolated PPS had a melt viscosity of 500 poises as measured in a KOHKA type flow tester at 300° C. using an orifice of a 0.5 mm diameter and a 2 mm length under a load of 10 kg.

The polymer was thermally cured at 235° C. for a further period of 2 hours in air to give a cured polymer product having an increased melt viscosity of 8,000 poises as measured by the above-specified method. The thus resulting cured, amino-containing polyphenylene sulfide material will be referred to as PPS-I.

Preparation 2
Curing of PPS under a non-oxidizing inert atmosphere

The procedure of Preparation 1 was repeated to give an uncured PPS, which was then heated to 230° C. for 10 hours under a nitrogen atmosphere. The thus thermally cured amino-containing polyphenylene sulfide had a melt viscosity of 1,500 poises. This product will be referred to as PPS-II.

Preparation 3
Synthesis of amino-containing polyphenylene sulfide

The general procedure of the preceding Preparation 1 as repeated except that 2009 g p-dichlorobenzene and 19.0 g 3,5-diaminochlorobenzene (corresponding to about 1 mol % of the p-dichlorobenzene used herein) were used in Preparation 3 and that the temperature of the reaction mixture was slowly raised to 250° C. over a period of one hour and 20 minutes and allowed to polymerize at 250° C. for a further 3 hours so as to give an amino-containing polyphenylene sulfide having a melt viscosity of 110 poises. The proportion of unconverted 3,5-diaminochlorobenzene remaining in the filtrate was determined by gas chromatography technique using Shimadzu GC-12A. It was found that 36% of the supplied 3,5-diaminochlorobenzene was converted. This polymer was thermally cured in air at 235° C. for a further 2 hours to attain an increased melt viscosity of 8,000 poises. The thus resulting cured, amino-containing polyphenylene sulfide material will be referred to as PPS-III.

Preparation 4
Synthesis of polyphenylene sulfide free of amino groups

The general procedure of Preparation 1 was repeated except that 2080 g p-dichlorobenzene was used with omitting the amino-containing aromatic halide, i.e. 3,5-diaminochlorobenzene.

The resulting polymer had a melt viscosity of 550 poises. Then the polymer was thermally cured in air at 235° C. for 2 hours to attain an increased melt viscosity of 8000 poises. The thus resulting cured polyphenylene sulfide material will be referred to as PPS-IV.

Preparation 5
Synthesis of amino-containing polyphenylene sulfide

An amino-containing polyphenylene sulfide resin was prepared by repeating the general procedure of the preceding Preparation 1 except that 2080 g p-dichlorobenzene and 18.4 g 2-chloroaniline (corresponding to about 1 mol % of the p-dichlorobenzene) were employed in this Preparation 5, and that the temperature of the reaction mixture was slowly raised to 250° C. over a period of one hour and 20 minutes and then the mixture was allowed to polymerize at 250° C. for a further 3 hours. The resulting amino-containing polyphenylene sulfide had a melt viscosity of 480 poises. Analysis of the unconverted 2-chloroaniline remaining in the filtrate by gas chromatography (using Shimadzu GC-12A gas chromatograph apparatus) revealed a 2-chloroaniline conversion of 35%.

The polymer was thermally cured in air at 235° C. for a further 2 hours to give a cured amino-containing polyphenylene sulfide having a melt viscosity of 8,000 poises. This cured polymer will be referred to as PPS-V.

Preparation 6
Synthesis of amino-containing polyphenylene sulfide

An amino-containing polyphenylene sulfide resin was prepared by repeating the general procedure of the preceding Preparation 1 except that 1789 g p-dichlorobenzene, and 310 g 3,5-diaminochlorobenzene (corresponding to about 15 mol % of the total amount of the p-dichlorobenzene and 3,5-diaminochlorobenzene present) were employed in this Preparation 6, and that the temperature of the reaction mixture was slowly raised to 250° C. over a period of one hour and 20 minutes and then the mixture was allowed to polymerize at 250° C. for a further 3 hours. The resulting amino-containing polyphenylene sulfide had a melt viscosity that was too low to be determined by the above-specified flow tester method. Analysis of the unconverted 3,5-diaminochlorobenzene remaining in the filtrate by gas chromatography (using Shimadzu GC-12A gas chromatograph apparatus) revealed a 3,5-diaminochlorobenzene conversion of 38%.

The polymer was thermally cured in air at 235° C. for a further 10 hours to give a cured amino-containing polyphenylene sulfide having an increased melt viscosity of 6,600 poises. This cured polymer will be referred to as PPS-VI.

Preparation 7
Graft copolymerization of polyethylene with acid

A high density polyethylene 97.5 weight % was premixed with maleic anhydride 2 weight % and 2,5-dimethyl-2,5-di(tert.-butyl peroxy)hexane 0.5 weight %. The premix was fed to an extruder machine with a cylinder maintained at a temperature of 210° C. During passage through the extruder, the premix was kneaded and allowed to react. By this procedure, pellets of a graft copolymerized, high density polyethylene were prepared.

Preparation 8
Preparation of carboxylic group-containing olefinic copolymer

An ethylene-butene-1 copolymer (commercially available under trade mark TAFMER A4090) 100 parts by weight was premixed with maleic anhydride 1 part by weight and 1,3-bis(tert.-butyl peroxy propyl) benzene 0.5 parts by weight. The premix was fed to an extruder machine with a cylinder maintained at 220° C. During passage through the extruder, the premix was kneaded and allowed to react. By this procedure, pellets of a carboxylic group-containing olefinic copolymer were prepared.

By IR spectrography, the quantity of maleic anhydride grafted on to the ethylene-butene-1 copolymer substrate was confirmed to be 0.75 parts by weight of maleic anhydride per 100 parts by weight of ethylene-butene-1 copolymer. This graft copolymer will be referred to as "modified PO".

Example 1

PPS-I from Preparation 1 and the graft copolymerized polyethylene from Preparation 7 were mixed in relative proportions of 90% and 10% by weight and fed to a vent-type vacuum twin-screw extruder which had a venting pressure of 30 Torrs at the vent. In the extruder, the mixture was kneaded at 300° C. to produce pellets thereof. A sample of the pellets was injection molded at a temperature of 300° C. to prepare various test specimens to be subjected to tests of:

Izod Impact Strength; notched, according to ASTM D-256
Tensile Elongation; according to ASTM D638, at 5 mm/minute
Heat Distortion Temperature; according to ASTM D648, with a load of 18.6 kg/cm$^2$ In addition, a ⅛ inch thick test specimen prepared for the heat distortion temperature test was subjected to a solvent resistance test, where the specimen was immersed in a gasohol mixture comprising gasoline and methanol in a weight ratio of 80:20, at a temperature of 125° C. for 8 hours. The weight of the specimen was measured before and after the immersion test. The solvent resistance performance was rated by the difference of the two weights.

The results are set forth in Table 1.

Example 2

PPS-II from Preparation 2 and the graft copolymerized polyethylene from Preparation 7 were mixed in relative proportions of 90% and 10% by weight. The mixture was processed and tested as in Example 1.

The results are set forth in Table 1.

Example 3

PPS-I from Preparation 1, the grafted polyethylene from Preparation 7, and glass fibers were mixed in relative proportions of 63%, 7% and 30% by weight. The mixture was processed and tested as in Example 1. The results are set forth in Table 1.

Example 4

PPS-V from Preparation 5 and the grafted polyethylene from Preparation 7 were mixed in relative proportions of 90% and 10% by weight. The mixture was processed and tested as in Example 1. The results are set forth in Table 1.

Comparative Examples 1 and 2

The procedure of Example 1 was repeated using either PPS-III or PPS-IV as an amino-containing polyphenylene sulfide material. The results are shown in Table 1.

Comparative Examples 3–6

PPS-I from Preparation 1, the grafted polyethylene from Preparation 7 and glass fiber were mixed in various relative proportions as given in Table 1. Each of the mixtures was processed and tested as in Example 1. The results are also shown in Table 1.

Comparative Example 7

PPS-I from Preparation 1 and an unmodified high density polyethylene were mixed in relative proportions of 90% and 10% by weight. The mixture was processed and tested as in Example 1. The results are shown in Table 1.

Comparative Example 8

PPS-VI from Preparation 6 and the grafted polyethylene from Preparation 7 were mixed in relative proportions of 90% and 10% by weight. The mixture was processed and tested as in Example 1. The results are shown in Table 1.

Comparative Example 9

PPS-I from Preparation 1 and the modified PO from Preparation 8 were mixed in relative proportions of 90% and 10% by weight. The mixture was subjected to the process as described in Example 1. However, during the melt-kneading in the vented twin-screw extruder, part of the melt was expelled through the vent. This made the extrusion procedure unstable. Further, it was found that the resulting pellets had bubbles caught therein. Furthermore, the moldings showed a poor appearance. The test results are shown in Table 1.

As above-illustrated, according to the invention, a specially prepared polyphenylene sulfide material containing a specified amount of amino groups is formulated with a specially modified polyethylene material so as to provide a polyphenylene sulfide resin composition which retains the desired properties, such as high temperature resistance and chemical resistance, possessed originally by the unmodified polyphenylene sulfide itself and is significantly improved in the toughness properties, such as impact strength, and in the tensile elongation properties.

4. A resin composition according to claim 1 wherein the amino-containing polyphenylene sulfide is produced by reacting an alkali metal sulfide with a dihalobenzene in the presence of an amino-containing aromatic halide in an organic amide solvent.

5. A resin composition according to claim 1 wherein the amino-containing polyphenylene sulfide has the amino groups attached to the ends of its molecule.

6. A resin composition according to claim 1 wherein the amino-containing polyphenylene sulfide comprises at least 70 mol % of p-phenylene sulfide structural unit represented by:

TABLE 1

| | Composition (% by weight) | | | | | | | | | | | Tensile elongation (%) | Izod impact strength (notched) (kg · cm/cm) | Heat distortion temperature (18.6 kg/cm$^2$) (°C.) | Solvent resistance (increase in weight) (%) |
|---|---|---|---|---|---|---|---|---|---|---|---|---|---|---|---|
| | PPS | | | | | | Polyethylene | | | Glass fibers | | | | | |
| | I | II | III | IV | V | VI | Graft-copoly-merized | Un-modi-fied | Modi-fied PO | | | | | | |
| Examples | | | | | | | | | | | | | | | |
| 1 | 90 | | | | | | 10 | | | | 10 | 5 | 103 | 2.0 |
| 2 | | 90 | | | | | 10 | | | | 12 | 5 | 102 | 2.0 |
| 3 | 63 | | | | | | 7 | | | 30 | 3 | 10 | 260 | 1.8 |
| 4 | | | | 90 | | | 10 | | | | 8 | 5 | 103 | 2.0 |
| Comparative Examples | | | | | | | | | | | | | | | |
| 1 | | 90 | | | | | 10 | | | | 3 | 3 | 101 | 2.2 |
| 2 | | | 90 | | | | 10 | | | | 3 | 3 | 101 | 2.2 |
| 3 | 100 | | | | | | | | | | 2 | 2 | 105 | 1.8 |
| 4 | 70 | | | | | | | | | 30 | 2 | 7 | 260 | 1.7 |
| 5 | 99.8 | | | | | | 0.2 | | | | 2 | 2 | 105 | 1.8 |
| 6 | | | | | | | | 60 | | | impossible to knead and extrude | | | |
| 7 | 90 | | | | | | | 10 | | | 2 | 2 | 104 | 2.5 |
| 8 | | | | | 90 | | 10 | | | | 1 | 1 | 100 | 2.2 |
| 9 | 90 | | | | | | | | 10 | | 5 | 3 | 101 | 2.5 |

What is claimed is:

1. A polyphenylene sulfide resin composition which comprises
   (A) 60–99.5% by weight of a thermally cured polyphenylene sulfide material having a melt viscosity of 500–30,000 poises and which has been derived, by thermally curing, from a polyphenylene sulfide having a melt viscosity of 400 poises or higher and containing 0.05–0.5% of amino groups on the basis of the phenylene sulfide repeating units, and
   (B) 40–0.5% by weight of a modified polyethylene material comprising high-density polyethylene onto which at least one unsaturated carboxylic acid and/or derivative thereof is graft-copolymerized in a proportion of 0.1–10% by weight of the total weight of said modified polyethylene material.

2. A resin composition according to claim 1 wherein component (A) contains 0.1–3 mol % amino groups.

3. A resin composition according to claim 1 wherein the amino-containing polyphenylene sulfide has a melt viscosity of 500 poises or higher before thermal curing and a melt viscosity of 1,000–2,000 poises after thermal curing.

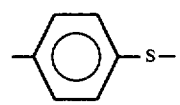

and remainder of one or more other copolymerized units selected from the group consisting of m-phenylene sulfide, o-phenylene sulfide, phenylene sulfide sulfone, phenylene sulfide ketone, phenylene sulfide ether, and diphenylene sulfide units in addition to the amino-containing units.

7. A resin composition according to claim 4 wherein the amino-containing aromatic halide reactant has the general formula:

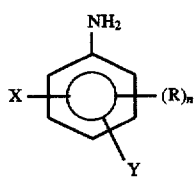

where X is a halogen, Y is hydrogen, —NH$_2$ or a halogen, each R is a hydrocarbyl group containing 1–12 carbon atoms and n is an integer of 0–4.

8. A resin composition according to claim 1 wherein component (A) is prepared by thermally curing the amino-containing polyphenylene sulfide in air at a temperature in the range of 200° to 280° C. for a period of from 1 to 12 hours.

9. A resin composition according to claim 1 wherein component (A) is prepared by thermally curing the amino-containing polyphenylene sulfide in a nonoxidizing atmosphere at a temperature of about 200° to about 280° C. for a period of from 1 to 24 hours.

10. A resin composition according to claim 1 wherein component (B) modified polyethylene material has 1–5% by weight of the unsaturated carboxylic acid and/or derivative thereof grafted thereon.

11. A resin composition according to claim 10 wherein the unsaturated carboxylic acid is selected from the group consisting of acrylic, methacrylic, maleic, fumaric, itaconic and citraconic acids and derivatives thereof.

12. A resin composition according to claim 11 wherein the acid is maleic anhydride.

13. A resin composition according to claim 1 wherein component (B) is prepared by mixing a polyethylene, an unsaturated carboxylic acid and/or derivative thereof and a radical generator and melt-extruding the mixture under copolymerization conditions.

14. A resin composition according to claim 13 wherein the radical generator is an organic peroxide.

15. A resin composition according to claim 1 wherein component (B) is prepared by dissolving or suspending a polyethylene in an appropriate solvent, adding an unsaturated carboxylic acid and a radical initiator to the liquor and heating the mixture at a copolymerization temperature.

16. A resin composition according to claim 1 which comprises 80–97% by weight of component (A) and 20–3% by weight of component (B).

17. A resin composition according to claim 1 wherein one or more conventional additives or fillers is incorporated at suitable levels.

* * * * *